L. A. FITZPATRICK.
TOOL FOR SETTING JEWELS.
APPLICATION FILED JULY 26, 1910. RENEWED MAY 27, 1913.
1,067,104.
Patented July 8, 1913.
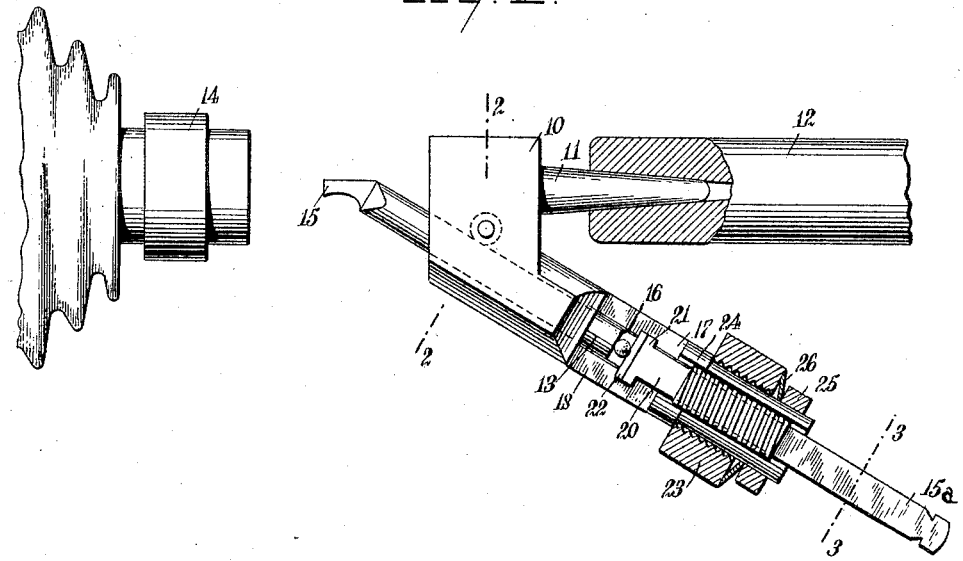
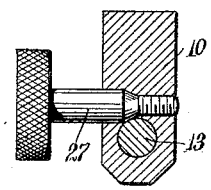
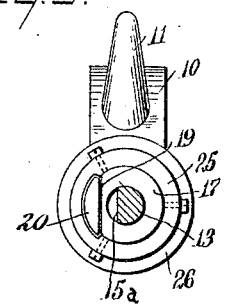
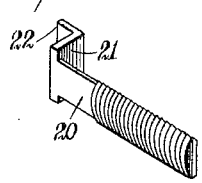
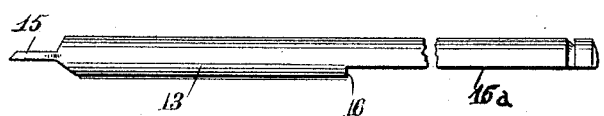
WITNESSES:
H. J. Walker
C. H. Fairbank
INVENTOR
Lloyd A. Fitzpatrick
BY
ATTORNEYS
COLUMBIA PLANOGRAPH CO., WASHINGTON, D. C.

UNITED STATES PATENT OFFICE.

LLOYD ARTHUR FITZPATRICK, OF KLAMATH FALLS, OREGON.

TOOL FOR SETTING JEWELS.

1,067,104.  Specification of Letters Patent.  Patented July 8, 1913.

Application filed July 26, 1910, Serial No. 573,886.   Renewed May 27, 1913.  Serial No. 770,277.

*To all whom it may concern:*

Be it known that I, LLOYD ARTHUR FITZPATRICK, a citizen of the United States, and a resident of Klamath Falls, in the county of Klamath and State of Oregon, have invented a new and Improved Tool for Setting Jewels, of which the following is a full, clear, and exact description.

This invention relates to certain improvements in tools or devices for use in setting jewels in watch plates, settings and the like, and the object of the invention is to provide for the automatic adjustment of the point or cutting edge of the tool in direct accordance with the size of the jewel to be set, so that the tool will automatically cut or turn out the seat of exactly the proper size.

In the use of my improved tool, it is not necessary to measure a hole to the proper measurement, but it is only necessary to insert the jewel within a clamp or holder on the tool, and the clamping or holding of the jewel will in itself insure the proper positioning of the point or cutting edge of the tool. The tool may be mechanically adjusted and used in the ordinary manner, and the automatic regulating means may be adjusted to take up wear on the cutting edge.

Reference is to be had to the accompanying drawings, forming a part of this specification, in which similar characters of reference indicate corresponding parts in all the figures, and in which—

Figure 1 is a side elevation of a tool and tool holder constructed in accordance with my invention, a portion thereof being broken away; Figs. 2 and 3 are transverse sections on the lines 2—2 and 3—3 of Fig. 1; Fig. 4 is a perspective view of one member of the jewel holder or clamp; and Fig. 5 is a top plan of the tool proper removed from the holder.

My improved tool is especially designed for use by watch repairers, although it is evident that the device could be used upon any occasion when it is desired to set a jewel. The device does away with the use of jeweling calipers or other similar measuring devices.

In the specific form illustrated, I employ a body 10, constructed of any suitable material and supported from the lathe center in any suitable manner, as, for instance by a tapered pin 11, rigidly secured to the body and fitting into a conical or tapering aperture in a chuck or other suitable part of the lathe. The body 10 constitutes a holder for a cutter or tool proper 13, which extends through the body and is disposed at an angle of thirty degrees to the axis of rotation of the holder 14 for the plate or setting which is being drilled to receive the jewel. The tool proper is provided with any suitable form of cutting edge or point 15, which may be adjusted in respect to the work only by moving the tool lengthwise through its inclined socket or opening in the body 10. The tool lies in the same plane with the axis of rotation and when the tool is withdrawn to the limiting extent within the body, its point or cutting edge will come directly in said axis. The rear edge of the tool proper is cut away so as to leave a flat side 15$^a$ terminating at one end in a shoulder 16, which latter constitutes one jaw or clamping member of the jewel holder. The body is provided with a downwardly-extending portion 17 disposed at an angle of thirty degrees to the axis of rotation and serving as a guide and carrier for the tool proper 13. A portion of this extension is flattened to present a face 18 in the plane of the flattened face 15$^a$ of the tool, and adjacent the shoulder 16. Beyond this flattened portion, a groove or channel 19 leads rearwardly to the end of the extension and within this groove is a slide 20 movable in the same general direction as the holder. This slide, which is shown particularly in Fig. 4, has a depending flange 21 extending down into engagement with the flattened face 18, and at the lower end of this shoulder is an outwardly extending jaw or clamping member 22, which in operation is disposed directly opposite to the shoulder 16.

The slide 20 is normally held stationary but may be adjusted longitudinally. As shown, the means for securing this longitudinal adjustment is a nut 23, encircling the rear portion of the extension 17 and held against longitudinal movement by a collar portion 24 integral with said extension and a collar 25 secured to the extension in any suitable manner, as, for instance, by set screws, as shown in Fig. 3. Between the collar 25 and the nut 23 may be a disk spring 26 tending to hold the nut against rotation and tending to prevent longitudinal movement. The slide 20 is disposed within the groove 19 and its outer edge is threaded to be engaged by the nut 23. By rotating the nut, the slide 20 is moved longitudinally at will.

As previously stated, the shoulder 16 and the jaw 22 constitute the two clamping members between which the jewel is held. In the normal operation of the device, the slide 20 is held stationary and when the two jaws are in engagement with each other, the point or edge of the cutting tool is in the axis of rotation.

In using the device, the tool proper is moved lengthwise to separate the two jaws and the jewel is held in place, as is indicated in Fig. 1. The tool proper 13 is then clamped in place by tightening a set screw 27 and the entire device is then advanced to the work revolving in the lathe, by pressing in the rear of the tail stock spindle. When the seat or recess is drilled or cut to the required depth, the tool illustrated is removed, the jewel inserted in the seat, and a burnisher inserted in place of the tool, to secure the jewel in place, so that as the distance between the shoulder 16 and the cutting edge, remains constant, the slide 20 need not be adjusted, but as the edge of the tool wears away, the slide is moved upwardly, so as to maintain the edge of the cutter in the axis of rotation when the jaws are in engagement with each other. It is also necessary to adjust the position of the slide when one cutting tool is replaced by another.

In using my tool, it is not necessary to measure the size of the seat or recess or to measure the jaw. As the tool moves in a line at an angle of thirty degrees to the axis of rotation, it is evident that the distance between any point on the tool and the axis of rotation in a line at right angles to the axis of rotation, will be exactly one-half the distance of the point from the axis of rotation along a line parallel to the tool. Thus, if the tool be moved lengthwise a distance equal to the diameter of the jewel, the cutting edge of the tool will be raised a distance equal to one-half the diameter of the jewel, that is, the radius of the jewel. The clamping of the jewel between the jaws will automatically bring the cutting edge to the proper position to cut a recess or seat of the proper size.

Having thus described my invention, I claim as new and desire to secure by Letters Patent:

1. A device for setting jewels, comprising a tool proper for cutting or drilling a recess or seat to receive the jewel, said tool proper being disposed at an angle of 30 degrees to the axis of rotation and having a clamping jaw, an adjustable stop provided with a clamping jaw for coöperating with the first-named clamping jaw to receive a jewel therebetween, and means for adjusting the said stop in a direction parallel with the axis of the tool.

2. A device for setting jewels, comprising a body, a tool movable through the body along the line of an angle of 30 degrees to the axis of rotation of the body, said tool having a jaw, and a jaw carried by the body for coöperating with the first-named jaw to receive a jewel therebetween the jaws being in the axial line of the tool.

3. A device for setting jewels, comprising a tool proper for cutting or drilling a recess or seat to receive the jewel and arranged at an angle of 30 degrees to the axis of rotation of the tool, a holder for the tool, said holder and tool having means in the axial line of the tool for supporting a jewel, the jewel spacing the tool apart longitudinally from the holder for the purpose specified.

4. A device for setting jewels, comprising a body, a tool proper movable therethrough along a line at an angle of thirty degrees, said tool proper having a jaw carried thereby, and a second jaw carried by the body, said jaws being opposed to each other in the axial line of the tool and adapted to receive a jewel therebetween.

5. A device for setting jewels comprising a body and a tool proper movable through the body at an angle to the axis of rotation of the body, said tool having a shoulder and the body having a stop with which the shoulder coöperates to hold a jewel, the jewel spacing the tool apart from the stop in the direction of movement of the tool, and means for adjusting the stop with respect to the holder.

6. A device of the class described, comprising a body portion having a downward and rearward extension, a tool proper movable along said extension and at an angle to the axis of rotation of the body to be cut or drilled, said tool proper having a shoulder thereon constituting a jaw, and a slide carried by said body portion and presenting a jaw movable toward and from the first-mentioned jaw, said jaws being adapted to receive a jewel therebetween.

7. A device of the class described, comprising a body having a downward and rearward extension presenting a flat face, a tool movable lengthwise of said extension and also presenting a flat face substantially flush with the first-mentioned face, and a slide movable lengthwise of said extension and adapted to coöperate with said tool to hold a jewel therebetween.

8. A device of the class described having a body, a downward and rearward extension thereon presenting a flat face along a portion of its length and having a groove extending lengthwise from said face, a slide movable along said groove and presenting a jaw adjacent said face, a nut encircling said extension and held against longitudinal movement and engaging with said slide to move the latter longitudinally, a tool proper extending through said extension and having a portion opposed to the portion of said slide, so as to hold a jewel in engagement with the latter, and means for clamping said tool against longitudinal movement through said extension.

9. A device for setting jewels comprising a body and a tool proper movable through the body at an angle of thirty degrees to the axis of rotation of the body, said tool having a shoulder and the body having a stop with which the shoulder coöperates to hold a jewel, the said jewel spacing the tool apart from the stop in the direction of movement of the tool, and means for adjusting the stop with respect to the holder.

10. A device of the class described, comprising a body portion having a downward and rearward extension, a tool proper movable along said extension and at an angle of thirty degrees to the axis of rotation of the body to be cut or drilled, said tool proper having a shoulder thereon constituting a jaw, and a slide carried by said body portion and presenting a jaw movable toward and from the first-mentioned jaw, said jaws being adapted to receive a jewel therebetween.

11. A device of the class described, comprising a body having a downward and rearward extension presenting a flat face, a tool movable lengthwise of said extension at an angle of thirty degrees to the body and also presenting a flat face substantially flush with the first-mentioned face, and a slide movable lengthwise of said extension and adapted to coöperate with said tool to hold a jewel therebetween.

12. A device of the class described having a body, a downward and rearward extension thereon presenting a flat face along a portion of its length and having a groove extending lengthwise at an angle of thirty degrees to the body from said face, a slide movable along said groove and presenting a jaw adjacent said face, a nut encircling said extension and held against longitudinal movement and engaging with said slide to move the latter longitudinally, a tool proper extending through said extension and having a portion opposed to the portion of said slide, so as to hold a jewel in engagement with the latter, and means for clamping said tool against longitudinal movement through said extension.

In testimony whereof I have signed my name to this specification in the presence of two subscribing witnesses.

LLOYD ARTHUR FITZPATRICK.

Witnesses:
C. P. GREGORY,
GEO. F. ELLIOTT.

---

Copies of this patent may be obtained for five cents each, by addressing the "Commissioner of Patents, Washington, D. C."